United States Patent [19]

Loth

[11] Patent Number: 4,600,172
[45] Date of Patent: Jul. 15, 1986

[54] RETRACTABLE ROUNDED TRAILING EDGE FOR CIRCULATION CONTROL WING

[76] Inventor: John L. Loth, P.O. Box 4094, Morgantown, W. Va. 26505

[21] Appl. No.: 569,575

[22] Filed: Jan. 9, 1984

[51] Int. Cl.$^4$ ............ B64C 21/08; B64C 21/04
[52] U.S. Cl. ............................. 244/207; 244/212
[58] Field of Search ............ 244/206, 207, 208, 212, 244/216

[56] References Cited

U.S. PATENT DOCUMENTS

| | | | |
|---|---|---|---|
| 3,064,927 | 11/1962 | Chaplin | 244/207 |
| 3,203,647 | 8/1965 | Alvarez-Calderon | 244/216 |
| 3,275,265 | 9/1966 | Alvarez-Calderon | 244/207 |
| 3,974,987 | 8/1976 | Shorr | 244/212 |

Primary Examiner—Galen L. Barefoot
Assistant Examiner—Rodney Corl
Attorney, Agent, or Firm—Banner, Birch, McKie & Beckett

[57] ABSTRACT

In a circulation control airfoil, the improvement comprises of a seprate and rounded compressed air supply duct, with a slot and ejector from which high velocity air can issue tangentially to its surface. The duct is supported by a hollow actuator arm which provides the blowing air as well as the torque required to retract or extend the rounded trailing edge of the wing and one or more hinged support brackets. The position of the hinge points being such that when the air supply duct is swung in the aft position then it joins the sharp trailing edge of the airfoil or its flap, and converts the airfoil to a STOL (Short Take Off and Landing) circulation control configuration with a rounded trailing edge. By exerting torque on the bell crank, the air supply duct can be swung forward, without much drag and be retracted in a cavity provided for it at the underside of the airfoil. With the rounded trailing edge recessed, the airfoil assumes to a conventional, low drag configuration for high speed cruise.

7 Claims, 2 Drawing Figures

RETRACTABLE ROUNDED TRAILING EDGE FOR CIRCULATION CONTROL WING

BACKGROUND OF THE INVENTION

1. Field of the Invention

This invention relates to and provides a mechanism for converting a high lift CC (Circulation Control) wing with a rounded trailing edge into a low drag configuration for high speed cruise. The object is to be able to retract and recess the rounded trailing edge in a cavity provided for it at the underside of the wing.

By structurally separating the rounded trailing edge from the flap with its sharp trailing edge, one has the option of employing the flap with or without circulation control.

This structural separation minimizes the drag and associated torque required during the retraction of the blowing air supply duct from the trailing edge position to the cavity at the underside of the wing.

The structural separation allows for thermal expansion of the high temperature blowing air supply duct, without inducing thermal stresses in the flap mechanism.

The junction between the flap and the air supply duct forms an ejector on top of the supply duct which reduces the blowing velocity without lowering the blowing momentum or lift augmentation. It generates suction from the secondary flow in the ejector which cools the flap and provides a suction force between the flap and the air supply duct. 2. Description of Prior Art The originator of CC high lift generation was I. M. Davidson, who filed British Pat. No. 913754 in 1960, titled "Aerofoil Boundary Layer Control System." The originator of the retractible duct with rounded surface and blowing to get high wing lift was Chaplin, U.S. Pat. No. 3,064,927, Nov. 20, 1962. His actuating linkages and motor were located inside the wing to avoid excessive aerodynamic drag. His patent does not describe the required means to rigidly connect the retractable duct to the wing extremity. The originator of the fully forward folding and retractible flap mechanism was Alberto Alvarez Calderon, U.S. Pat. No. 3,275,265, Sept. 27, 1966. The trailing edge of his flap was rounded by incorporating a blowing air duct at its extremity. Such a configuration with circulation control blowing was first test flown by Loth and Fanucci at West Virginia University on Apr. 10, 1974. The flap was actuated by a hollow actuator arm adjacent to the fuselage with centerline of rotation coinciding with the flap hinge line. This was necessary because the air supply duct is an integral part of the flap as shown by Calderon. This eliminates the freedom in locating the flap hinge point and in operating the flap without blowing. Another draw back of combining the flap and air duct is the large torque required to retract the flap through the 90 degree down position. Various alternate forms of boundary layer control have been proposed. A cascade of blowing slots which increase in number as the flap angle increases, was proposed by Shorr, U.S. Pat. No. 3,974,987 Aug. 17, 1976.

In 1968 the concept of Circulation Control by Blowing over a Rounded Trailing Edge was theoretically investigated by R. J. Kind at Cambridge University. In the following years an elliptical CC airfoil, for helicopter applications, was investigated by R. M. Williams at NSRDC (Naval Ship Research and Development Center), and by R. E. Walters, N. Ness and others at WVU (West Virginia University). In 1970, J. L. Loth at WVU introduced a fixed wing aircraft application of the CC airfoil. The first proposed configuration was the model A wing. This employed a conventional plain flap airfoil of which the structure upstream of the flap hinge was altered. It was modified into a low pressure air supply duct with a slot nozzle allowing air to be blown over the flap. The bottom portion was recessed which permitted the flap to fold under. In this configuration the flap provides a rounded trailing edge for circulation control by blowing. This concept was tested in all three configurations: conventional, blown flap and the CC airfoil mode. The reduction in wing area in the CC configuration prompted the design of the Model B wing in accordance with Calderon's patented configuration. In this design the airfoil fixed sharp trailing edge was equipped with a piano hinge attached to a flap with a rounded trailing edge. In the circulation control configuration the flap was folded out to increase both the wing area and the maximum obtainable lift coefficient. This design was described by Loth at the 1973 SAE Business Aircraft Design Meeting in Wichita, Kans., Paper No. 730328. In 1974 the Model B wing concept was tested at WVU on the first Circulation Control Technology Demonstrator STOL Aircraft. The flight performance test result were reported in the March 1976 issue of the Journal of Aircraft by J. L. Loth, J. B. Fanucci, and S. C. Roberts. A drawback of the model B wing design is that the rounded trailing edge air supply duct is attached to the flap and both must be rotated forward to retract to the cruise configuration. With the flap in the vertical downward position, the associated aircraft drag and required flap torque are large. The second design limitation was that the compressed air supply duct had to exit the fuselage concentric with the hinge line of the flap. The third design limitation was that the flap could not be used independently in the conventional mode, without the rounded trailing edge. These three limitations have been overcome in the improvement presented herein. Soon after the CC concept was flight tested at West Virginia University, the Navy provided an A6 aircraft for modification with a CC high lift device. The CC modification was designed by R. J. Englar at NSRDC as a non-retractable, fixed and large rounded trailing edge. This second CC Technology Demonstrator A6 aircraft was first flown in 1979. The high drag penalty of its fixed rounded trailing edge motivated Englar to optimize CC airfoils with fixed and very small trailing edge radius. This resulted in his 1979 U.S. Pat. No. 4,387,869 on a Combined Supercritical/CCW high lift airfoil. Recent research on CC wing optimization by Loth and M. Boasson is scheduled for publication in the February 1984 issue of the Journal of Aircraft.

SUMMARY OF THE INVENTION

The present invention relates to a mechanism for retracting the rounded trailing edge of a CC airfoil without the limitations imposed by the Model B wing design. Its features are:

(1) Structurally separating the rounded trailing edge from the flap, thereby eliminating the high drag and torque associated with the forward folding of the flap in the Model B wing.

(2) Structurally separating the rounded trailing edge from the flap, thereby eliminating the need for aligning the blowing air supply duct with the flap hinge line which increases the freedom of choice for the location of the cavity in which the rounded trailing edge is to be recessed.

(3) Structurally separating the rounded trailing edge from the flap, thereby allowing the aircraft to operate the flaps either in the conventional mode or in the high lift CC mode with the rounded trailing edge folded out.

(4) Structurally separating the high temperature rounded trailing edge from the flap, thereby improving the thermal isolation and associated thermal stresses in the flap mechanism.

(5) Forming an ejector at the blowing slot thereby providing suction air which provides the suction force required to keep the rounded trailing edge firmly attached to the aft edge of the flap mechanism.

DESCRIPTION OF THE PREFERRED EMBODIMENT

Figure 1:
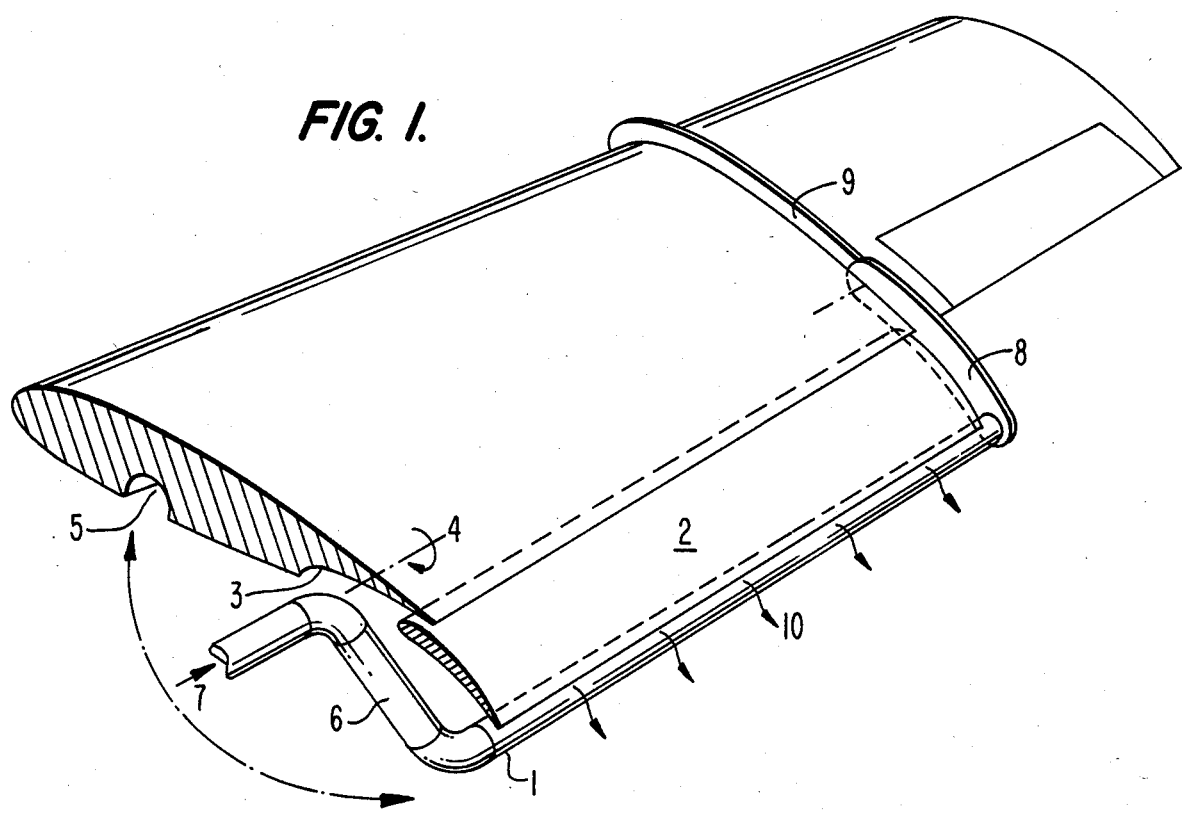
FIG. 1 shows the typical aircraft right wing equipped with a separate rotating, retractable rounded trailing edge and a retractable sliding flap.

The present invention is shown in FIG. 1. The right wing of an aircraft is shown with two independently actuated components. Item 1 is the compressed air supply duct which can be rotated aft to serve as the rounded trailing edge in the CC airfoil configuration. Item 2 is the sliding flap which can be used with or without the rounded trailing edge in the CC configuration. Note the flap can be retracted by sliding in the recessed area 3 of the wing. Item 1 can be retracted by rotating forward about the hinge line 4 and be recessed in cavity 5 provided at the underside of the wing. The torque required to rotate the air supply duct 1 is provided by the bell crank 6 which is hollow, to allow compressed air to be supplied from the fuselage as shown by arrow 7. The outboard side of the air supply duct is supported by hinge bracket 8 which is mounted such as to allow thermal expansion of the air supply duct. The outboard fence 9 is required to separate the high lift inboard section from the aileron section of the wing. The CC air flowing over the rounded trailing edge, formed by the air supply duct, is indicated by item 10.

Figure 2:
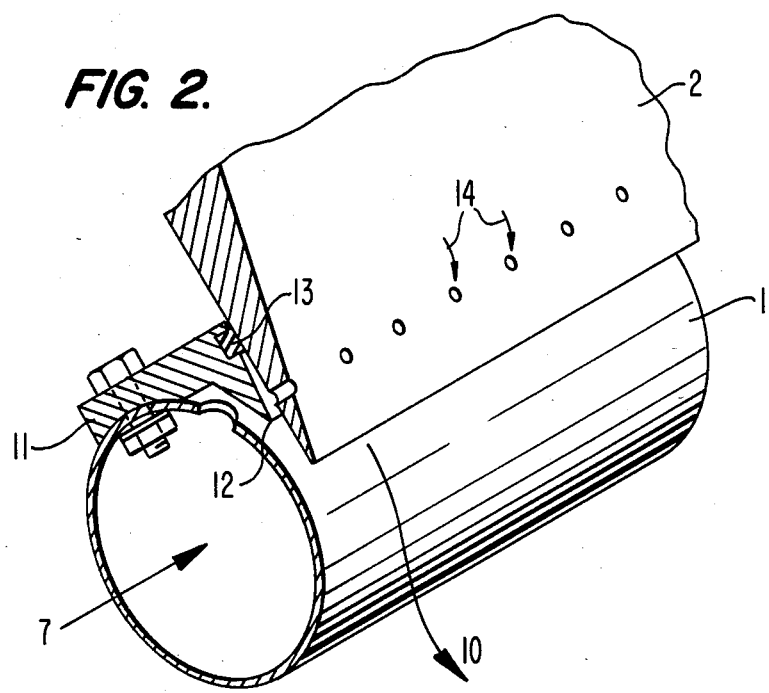
FIG. 2 shows the detail of the blowing slot which forms an ejector and provides suction air to generate a suction force between the rounded trailing edge and the flap, as well as providing cooling and boundary layer control air.

A detailed section of the air supply duct 1 is shown in FIG. 2. A two-dimensional saddle 11 is bolted to the air supply duct and forms a converging-diverging nozzle item 12 for the supersonic primary blowing air. The flap forms the ejector outlet slot from which the CC blowing air emerges as jet 10. The flap is sealed to the saddle by item 13. A vacuum is created between items 11 and 2 by ejector action. The secondary ejector air in entrained thru holes 14 to cool the flap and provide boundary layer control by suction.

What is claimed is:

1. A high-lift circulation control wing having a sliding, retractable flap, movable from a recessed position to an extended position, said high-lift circulation control wing comprising:

a rounded trailing edge positionable along the outer longitudinal edge of said retractable flap when said retractable flap is in its extended position, said rounded trailing edge being formed by a cylindrical air supply duct which conducts compressed air injected from the fuselage, said air supply duct including slots from which the compressed air is ejected in a direction tangential to the surface of the air supply duct when said rounded trailing edge is positioned along the outer longitudinal edge of said retractable flap to thereby increase lift; and positioning means coupled to said rounded trailing edge for selectively positioning said rounded trailing edge independently of said retractable flap, said positioning means extending said rounded trailing edge to a position along the outer longitudinal edge of said retractable flap independent of the retractable flap to increase lift and retracting said rounded trailing edge to a storage position to enable said circulation control wing and said retractable flap to function as a conventional airfoil.

2. A high-lift circulation control wing as in claim 1 wherein said positioning means comprises a hollow bell crank attached at one end of said air supply duct so that compressed air can flow through said bell crank and said air supply duct.

3. A high-lift circulation control wing as in claim 1, further comprising a cavity formed in the underside of the wing, said rounded trailing edge being securely held within said cavity when said rounded trailing edge is retracted for storage.

4. A high-lift circulation control wing as in claim 2 further comprising a two-dimensional saddle connected to said air supply duct to form a nozzle for directing the compressed air ejected from said air supply duct.

5. A high-lift circulation control wing as in claim 4 further comprising a gap formed between the retractable flap and the two-dimensional saddle, which produces a suction area so as to couple said rounded trailing edge to the flap when said rounded trailing edge is extended.

6. A high-lift circulation control wing as in claim 1 further comprising an outboard fence extending transversely across the wing to divide the high lift position of the wing which is formed by said rounded trailing edge from the remainder of the wing.

7. A high-lift circulation control wing as in claim 4 further comprising a plurality of holes formed in the flap through which some of the compressed air passes for producing a suction seal between the flap and said rounded trailing edge so as to couple said rounded trailing edge to the flap when said rounded trailing edge is extended.

* * * * *